United States Patent [19]

Södler et al.

[11] Patent Number: 4,813,505
[45] Date of Patent: Mar. 21, 1989

[54] BALANCE WITH SCALE ON TOP AND PARALLEL GUIDE CONSISTING OF A ONE-PIECE CASTING AND ONE-PIECE PARALLEL GUIDE SYSTEM

[75] Inventors: Walter Södler, Göttingen; Eberhard Lübke, Hardegsen; Otto Kuhlmann, Göttingen, all of Fed. Rep. of Germany

[73] Assignee: Sartorius GmbH, Fed. Rep. of Germany

[21] Appl. No.: 143,037

[22] Filed: Jan. 12, 1988

[51] Int. Cl.$^4$ .......................... G01G 7/00; G01G 3/08
[52] U.S. Cl. ..................................... 177/212; 177/229
[58] Field of Search ...................... 177/211, 212, 229; 73/862.65

[56] References Cited

U.S. PATENT DOCUMENTS 4,505,345  3/1985  Jetter ........................... 73/862.65 X
4,678,050  7/1987  Wirth et al. ...................... 177/229
4,699,228  10/1987  Mustarelli et al. ................. 177/212

Primary Examiner—George H. Miller, Jr.
Attorney, Agent, or Firm—Eric P. Schellin

[57] ABSTRACT

It is disclosed for a balance with a scale on top based on the principle of the electromagnetic compensation of force with a system carrier fixed to the housing, with a load receiver, with two guide rods which connect the load receiver to the system carrier in a vertically movable direction as parallel guide, whereby the stem carrier, the two guide rods and the load receiver are designed as a one-piece casting, with a translation lever and with a coupling element between load receiver and translation lever, whereby the force from the load receiver corresponding to the mass of the weighed material is transferred via the coupling element to the shorter lever arm of the translation lever and the coil of the electromagnetic compensation of force is fastened to the longer lever arm of the translation lever that the system carrier comprise lateral projections which extend into the area between the guide rod arms. This achieves a distinct reinforcement of the system carrier without having to increase the outer dimensions of the system. The stability of the entire system can be further increased by means of further reinforcement measures in the lad receiver and in the guide rod arms.

18 Claims, 6 Drawing Sheets

BALANCE WITH SCALE ON TOP AND PARALLEL GUIDE CONSISTING OF A ONE-PIECE CASTING AND ONE-PIECE PARALLEL GUIDE SYSTEM

The invention relates relative to a balance with a scale on top based on the principle of the electromagnetic compensation of force with a system carrier fixed to the housing, with a load receiver, with two guide rods which connect the load receiver to the system carrier in a vertically movable direction as parallel guide, whereby the system carrier, the two guide rods and the load receiver are designed as a one-piece casting, with a translation lever and with a coupling element between load receiver and translation lever, whereby the force from the load receiver corresponding to the mass of the weighed material is transferred via the coupling element to the shorter lever arm of the translation lever and the coil of the electromagnetic compensation of force is fastened to the longer lever arm of the translation lever.

Balances of this type are known from DE-OS No. 34 22 042. They have the advantage that they are economical to manufacture, since the cost-intensive assembly work is sharply reduced. However, the known designs have the disadvantage that the stability, especially that of the system carrier, is deficient in the case of large torques, which are transmitted in the case of large balance scales onto the system by means of off-center loading of the balance scale, on account of limited space conditions.

The invention therefore has the object of increasing the stability of the system, especially of the system carrier, and therewith also making it possible to construct balances with a scale on top with large balance scales and for large maximum loads.

SUMMARY OF THE INVENTION

The invention achieves this object as follows: The system carrier comprises lateral projections which extend into the area between the guide rod arms.

The stability of the system carrier can be increased without increasing the outer dimensions of the system by utilizing the area between the guide rod arms.

In order to also increase the weight of the system as little as possible, the lateral projections are advantageously designed as hollow bodies which are open to the outside.

In order to also reinforce the load receiver, it advantageously comprises two integrally cast boxes which broaden it at least to the width of the system carrier. This makes it possible in a preferred embodiment to screw crossbars to the outer sides of the integrally cast boxes and the balance scale can be supported on these crossbars. Thus, force is introduced in this embodiment far from the areas of the load receiver at which the guide rods and the coupling element are connected to the load receiver. This minimizes the reactive effects of different introductions of loads into the load receiver on the geometry of the parallel guide and minimizes the transfer of force to the translation lever.

In order to also increase the stability of the guide rod arms, the middle sections of the guide rod arms are advantageously reinforced and ribbed. These ribs are advantageously designed as hollow bodies and are open to the outside.

The resolution of the arms into a ribbed structure formed by perforations, troughs, pockets or blind holes achieves a reduction of weight and at the same time the stiffness to forces from different directions is retained and an accumulation of material at different points is avoided.

A further advantageous stiffening of the entire system for the casting process, opening the mold and the fine working results if the casting comprises casting bridges between the guide rods and the system carrier and between the load receiver and the system carrier which are not separated until the end of the working of the casting.

BRIEF DESCRIPTION OF THE DRAWINGS

The invention is described in the following with reference made to the schematic figures.

DETAILED DESCRIPTION OF THE INVENTION

Figure 1:
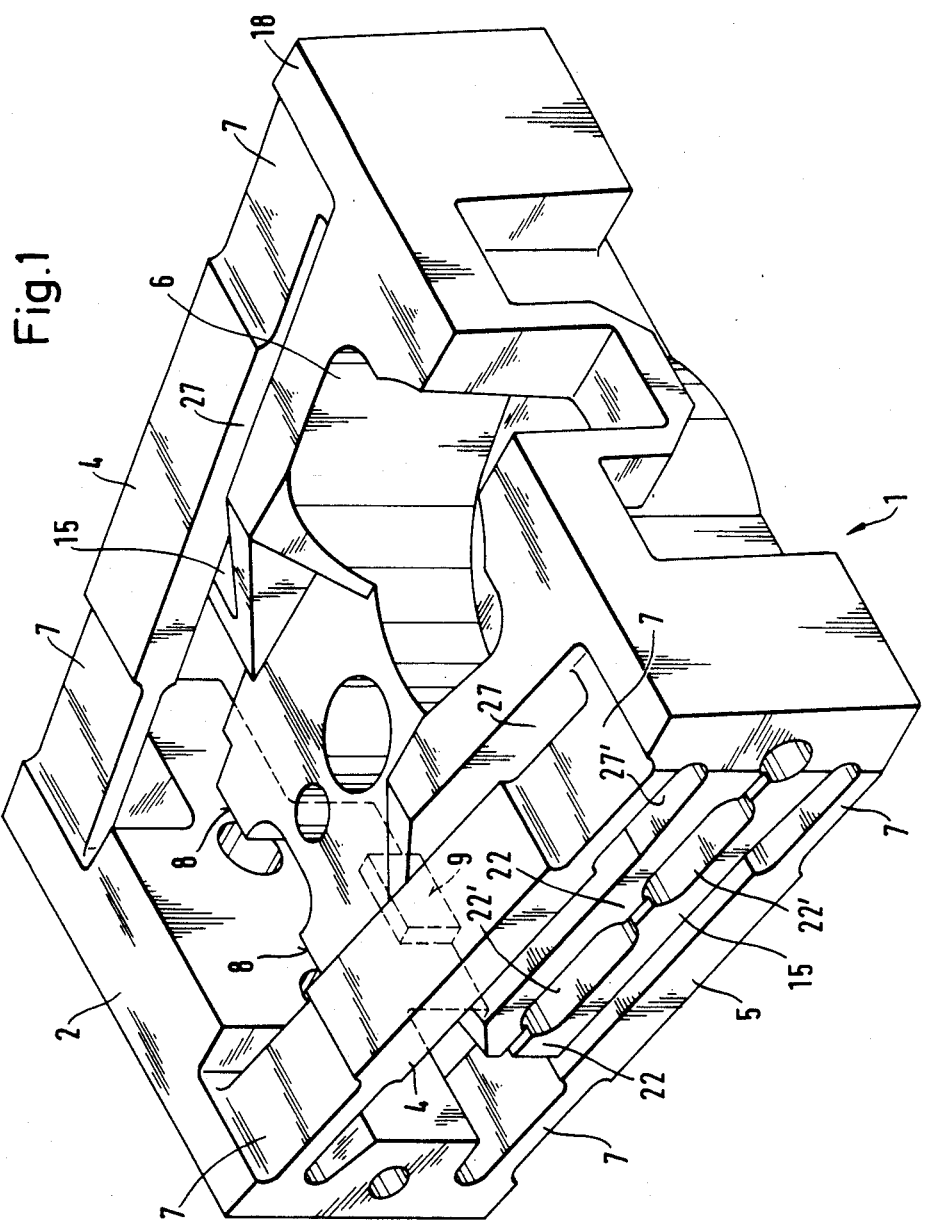
FIG. 1 shows a perspective view of a first embodiment of an ingot with parallel guide.
Figure 2:
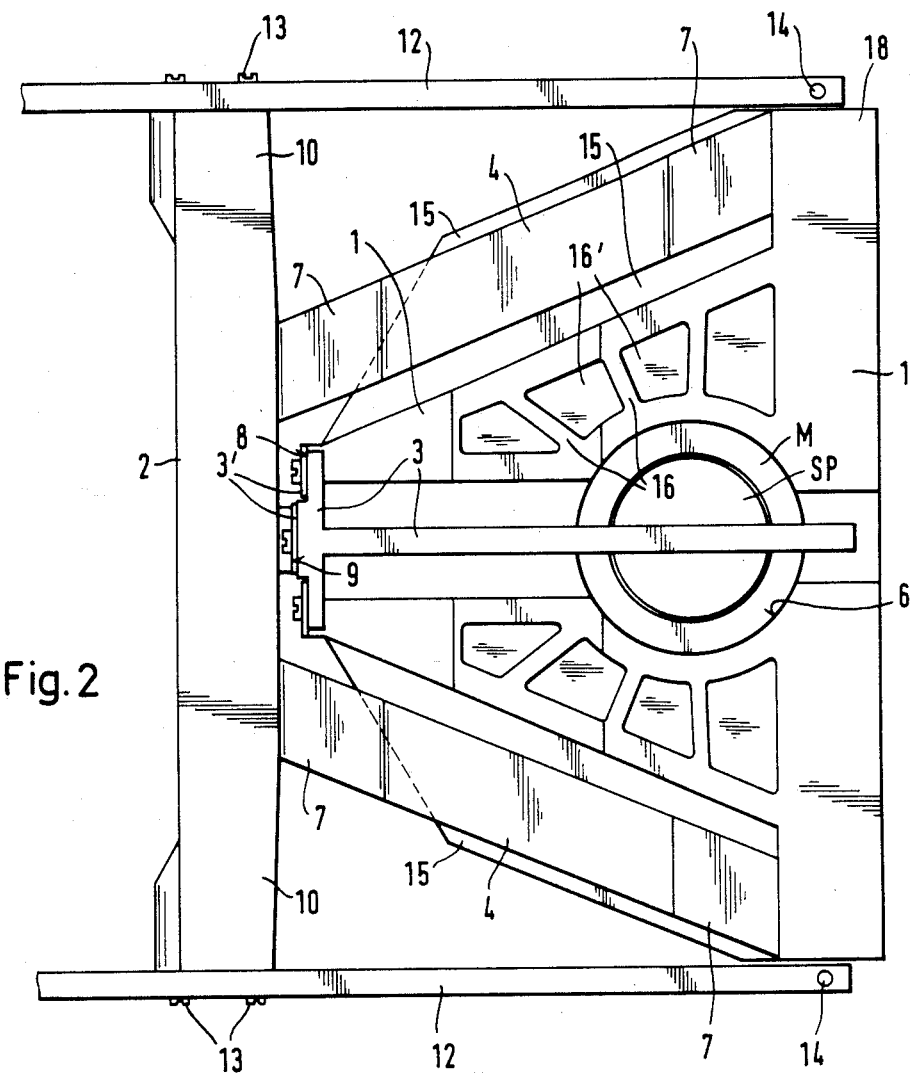
FIG. 2 shows a top view onto a modified finished casting with parallel guide supplemented by a few important components of the balance and with screwed-on crossbars.
Figure 3:
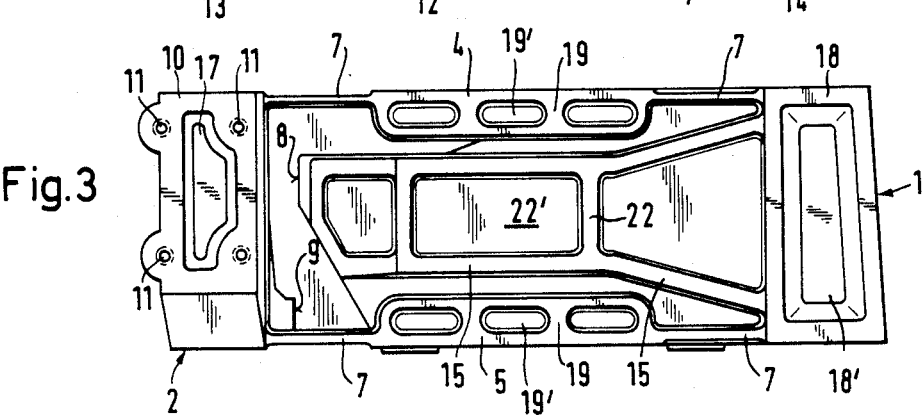
FIG. 3 shows a side view of the finished casting according to FIG. 2 as parallel guide without the screwed-on crossbars and other components.

The castings according to FIGS. 1 and 2,3 basically coincide, so that functionally identical parts exhibit the same designations of position and the same position numbers and preferably consist of aluminum die casting.

The finished casting of the parallel guide of the balance shown in FIGS. 1,2 in a top view and in FIG. 3 in a side view consists of system carrier 1, to whose back area 18 two upper guide rod arms 4 and two lower guide rod arms 5 are connected via thin areas 7. The other end of guide rod arms 4,5 is connected, again via thin areas 7, to load receiver 2, so that a customary guide rod parallel guide is created for load receiver 2. Load receiver 2 also comprises screw-on surface 9 for fastening coupling element 3' for an articulated connection between load receiver 2 and translation lever 3 and coil SP.

System carrier 1 comprises recess 6 for receiving permanent magnet M of the electromagnetic compensation of force, screw-on surfaces 8 for screwing on the spring bearing of translation lever 3', comprises ribs 16 on the top and the bottom and comprises lateral projections 15 which extend into the area between guide rod arms 4,5. These lateral projections 15 are designed as hollow bodies, whereby the walls 22 with their drafts can be recognized in FIG. 3. These lateral projections 15 reinforce the middle part 1 of the system carrier and impart a greater stability especially to back areas 18 of the system carrier and assure that the horizontal forces transferred from guide rod arms 4,5 via thin areas 7 are received without significant deformations of system carrier 1. In FIG. 2, these lateral projections 15 are shown only half as large for the sake of clarity, so that they project somewhat over guide rod arms 4,5. However, projections 15 can also, as is shown in FIG. 1, end flush with the outer edges of guide rod arms 4,5 or terminate a few millimeters within the contour of guide rods 4,5,7.

FIG. 2 also shows boxlike extensions 10 of load receiver 2, which are so long that crossbars 12 can be screwed fast to their ends by screws 13 without colliding with ends 18 of system carrier 1. Receiving points 14 for supporting and centering the balance scale (not shown) are located on crossbars 12. In FIG. 3, crossbars 12 are omitted for the sake of clarity. This shows hollow area 17 in extension 10 and screw holes 11 for screws 13.

FIG. 3 also shows ribs 19 in the middle section of guide rod arms 4,5. These ribs 19 form hollow bodies open to the outside. This makes it possible for ribs 19 in guide rod arms 4,5, ribs 22 in lateral projections 15 of system carrier 1 and boxlike extensions 10 of load receiver 2 to be released from the mold on each side by only one slide.

Figure 4:
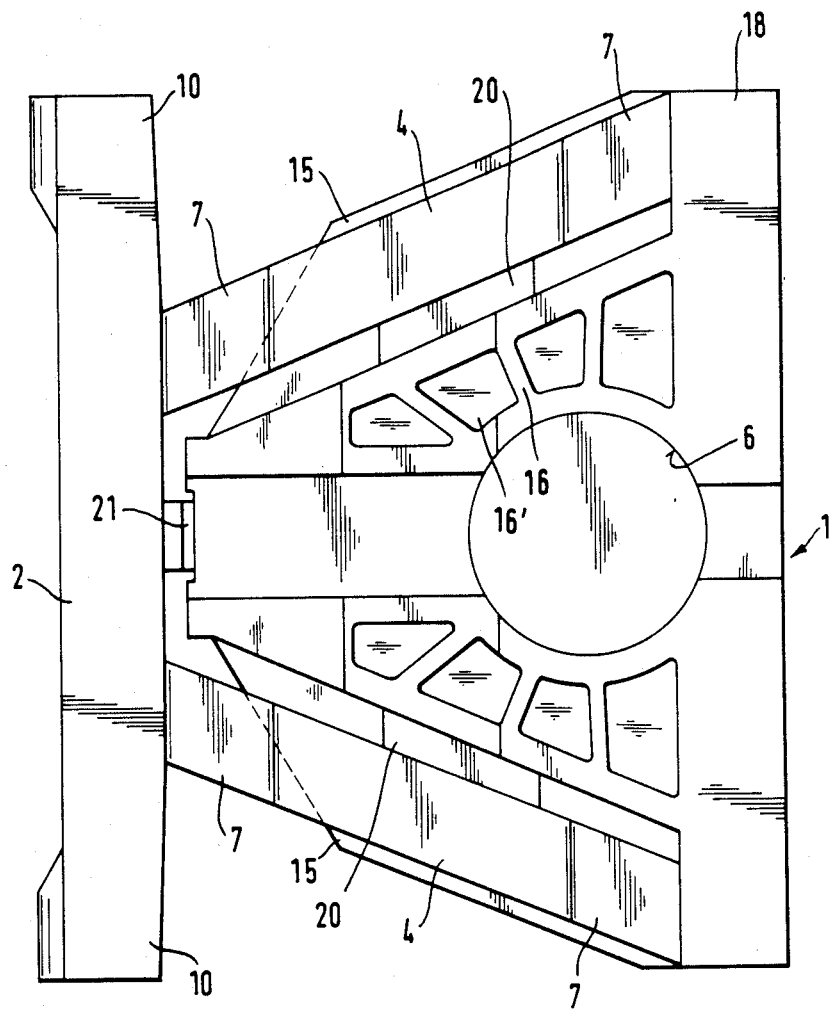
FIG. 4 shows a top view of the casting according to FIGS. 2,3 of the parallel guide in an unfinished state with casting bridges not yet removed.

FIG. 4 shows the casting in the same view as in FIG. 2, but in an unworked initial state. In addition to the apart already explained for FIGS. 1,2 and designated with identical reference numerals, this Figure shows casting bridges 20 between guide rod arms 4 and system carrier 1 and shows casting bridge 21 between load receiver 2 and system carrier 1. These casting bridges 20,21 fix the parts of the system which are connected to system carrier 1 only by thin areas 7 of the guide rods during the opening of the mold and in the first processing steps. These casting bridges are removed in the last processing step, e.g. by milling, and the movability of load receiver 2 relative to system carrier 1 is present only after this processing step.

The parallel guide system shown in more detail in FIGS. 5 to 8 and designated in its entirety by 1 consists of a one-piece aluminum diecasting part with a middle area 15 and a back area 18 as system base which can be fastened by lower base fastening 24 to fixed points of a surrounding housing or a mounting plate. Back area 8 of the system base is connected via two upper guide rod arms 4 and two lower guide rod arms 5 via thin areas 7 to load receiver 2 located in the front area, so that a guide rod parallel guide is created for load receiver 2. Load receiver 2 also comprises crew-on surface 9 for fastening a coupling element (not shown) for an articulated connection between load receiver 2 and a translation lever (not shown). Bearing 6 in the form of a cylindrical perforation or a cylindrical recess for receiving a cup-shaped permanent magnet (not shown) of the electromagnetic compensation of force is sunk in back area 18 of parallel guide system 1. Other screw-on surfaces 8 for screwing of the spring bearing of the translation lever (not shown) are likewise formed in the casting and must be prepared, if necessary, by machining for assembly.

Parallel guide system 1 is designed essentially symmetrically in relation to a top view and exhibits a longitudinal axis SA which is at the same time the axis of symmetry, a transverse axis QA which runs through the central point of cylindrical receiving bearing 6 and a vertical axis of plane HA which also runs through the central point of receiving bearing 6. In the embodiment shown, parallel guide system 1 has essentially the shape of a symmetrical trapezoid in which load receiver 2 forms the shorter side of the trapezoid and the long side of the trapezoid running parallel thereto is formed by back part 18 of the system carrier. Both parts 2, 18 are connected by obliquely running upper and lower guide rods 4,5 and thin areas 7.

Vertically upward and downward-projecting ribbing 16 of system basis 15,18 is formed by radial webs and tangential webs around the central point or the vertical axis of plane HA of cylindrical receiving bearing 6. Base part 15, which is also designed approximately trapezoidally, is separated from the two upper and lower guide rods 4,5 and thin areas 7 by corridor-like groove 27, which, however, also appears as opening 27' (FIG. 6) in a side view. Ribs 16 running on the top and on the bottom in the direction of openings 16', 27 converge in their cross section in the direction of the openings, and hollow areas 16', 6, 27 diverge in the direction of their openings and run in the direction of parallel lines P to vertical axis of plane HA. The horizontal walls of the openings form disk-like reinforcements thereby in a horizontal direction.

The load receiver 2 held approximately parallel to a transverse system axis QA and at a parallel interval by the upper and lower guide rods 4,5 and thin areas 7 of the parallel guide and the back area 18 of the ingot, which back area is associated with the system base 15, 18, are designed in a box profile with hollow areas 17, 18, opening outwardly and diverging on both sides of a longitudinal axis SA to be considered an axis of symmetry.

Upper and lower guide rods 4,5 located at a vertical interval comprise ribs 19 and outwardly been pockets 19' in the reinforced middle area following thin areas 7 on both sides, whereby ribs 19 are aligned on both sides of longitudinal system axis SA in the direction of system axis QA or parallel thereto and whereby ribs 19 converge in their cross section in relation to parallels P or transverse system axis QA in the direction of the openings whereas pockets 19' diverge in the direction of the pocket openings. The box profile of load receiver 2 comprises prolongations 10" in the vertical plane which comprises converging ribs 25, 26 and diverging openings 25', 26' in the direction of longitudinal system axis SA and opening away from base part 15, 18 and which prolongations are visible in FIGS. 5,7.

Figure 5:
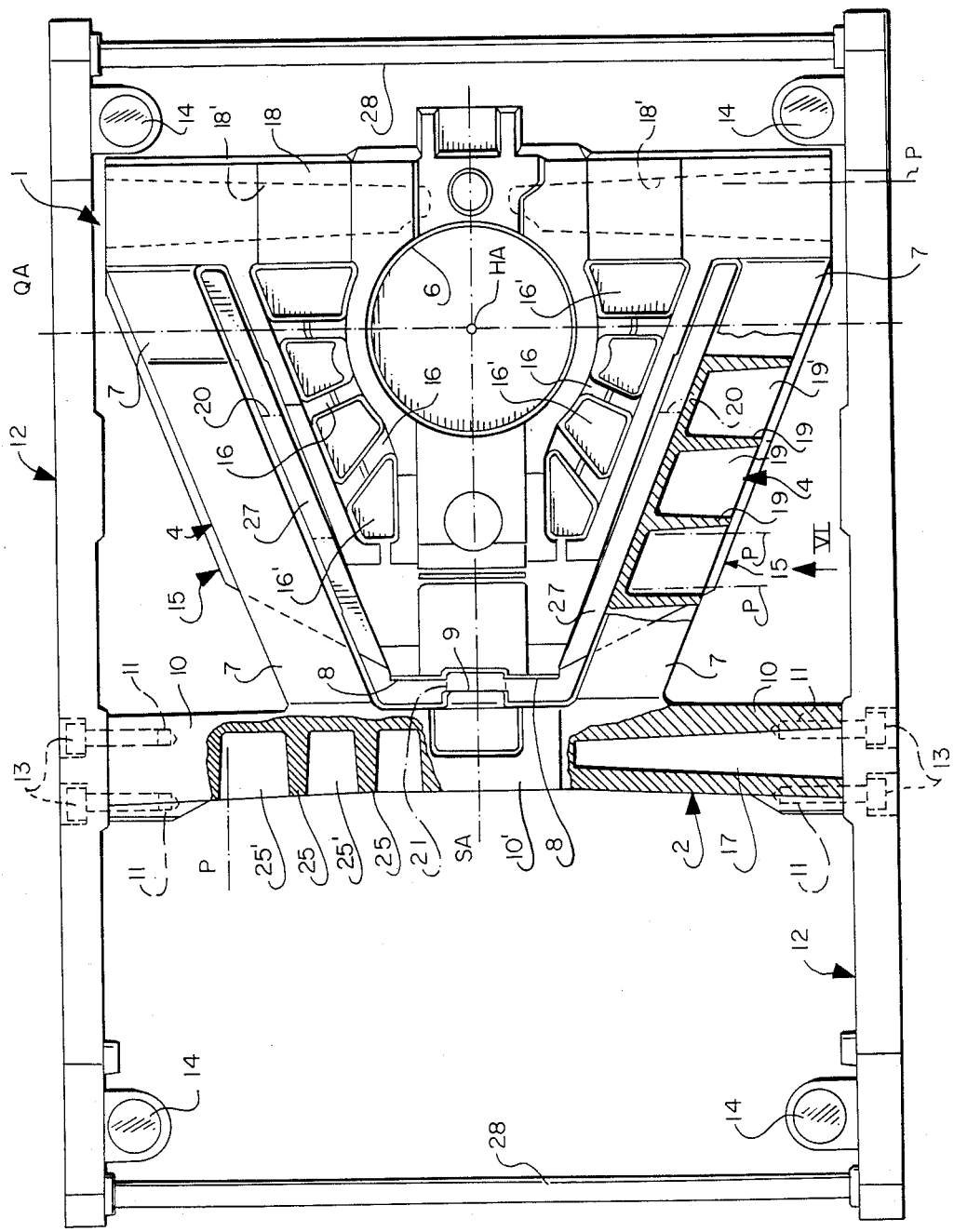
FIG. 5 shows a detailed top view of a parallel guide system in aluminum diecasting practice, partially in horizontal section.
Figure 6:
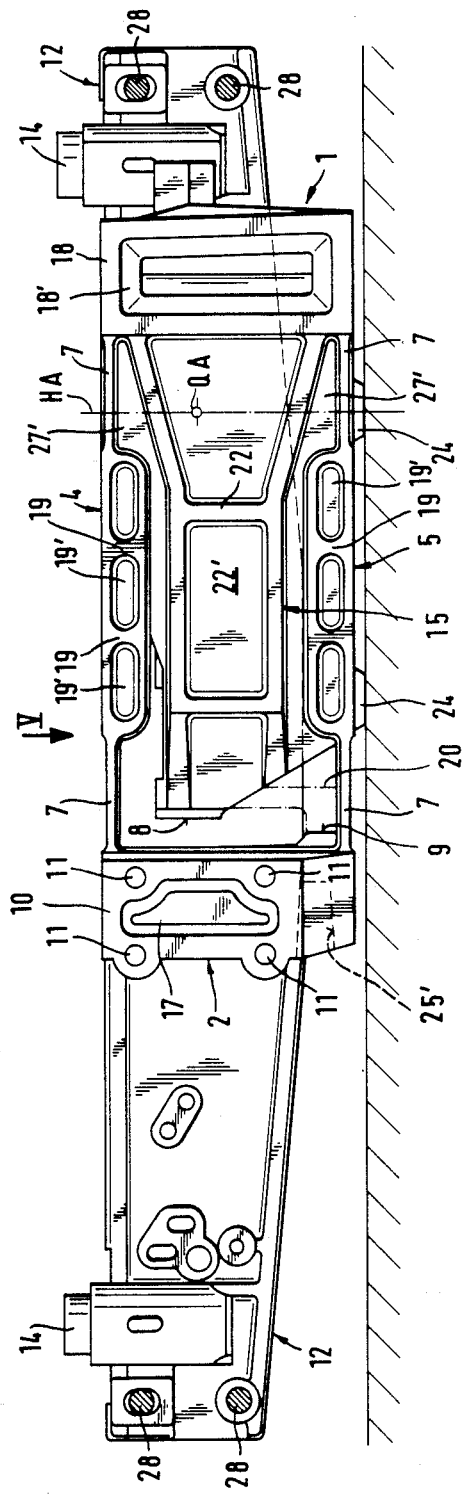
FIG. 6 shows a side view.
Figure 7:
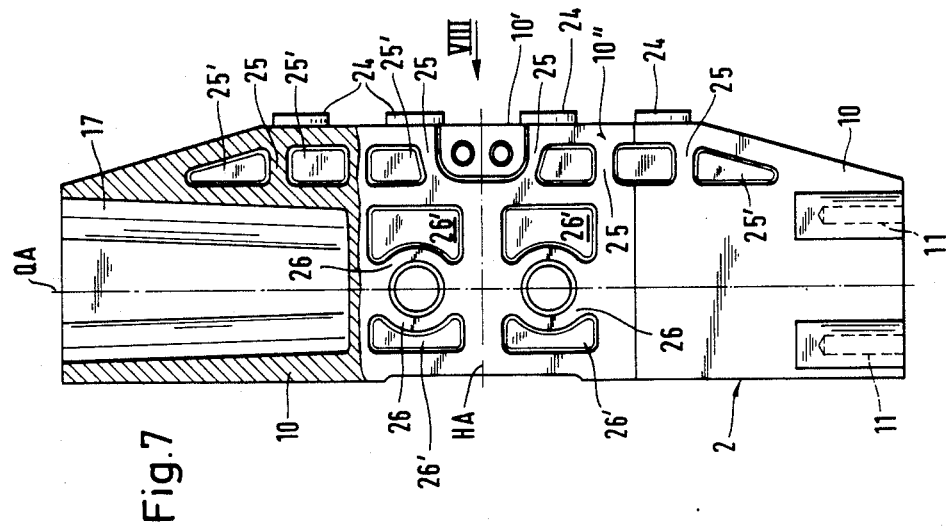
FIG. 7 shows a front view of the parallel guide system of the left side according to FIG. 5, partially invertical section.
Figure 8:
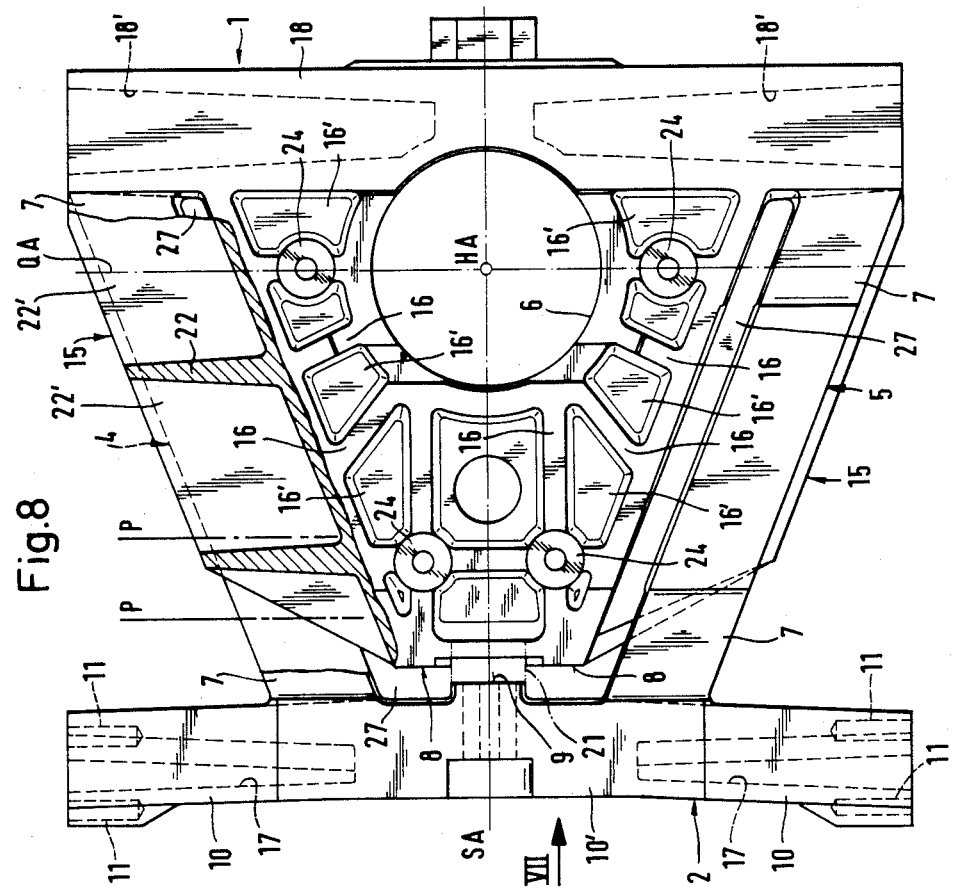
FIG. 8 shows a bottom view under the parallel guide system, partially in horizontal section.

In a similar manner, the lateral limitations of middle part 15 of the system base are provided according to FIG. 8 with ribs 22 and pockets 22'. Middle part 10' of load receiver 2 comprises prolongations 10 running parallel to transverse system axis QA which widen the latter at least to the width of back base part 18. Prolongations 10 are likewise designed with a box profile, whereby pockets 17 diverge toward the opening and comprise screw-on holes 11 or fastening bearings for crossbars 12 on their front surfaces with which load receiver 2 can be completed by means of additional rods 28 to a load receiver frame 12, 28, as is indicated in FIG. 5. These crossbars 12 are likewise designed as a casting with ribs and comprise fastening bearings 14 on their ends for receiving a rectangular load scale.

The entire parallel guide system is structured by means of ribbings and pockets and perforations like a filigree in order to form thin walls and to reduce accumulations of material and can thus introduce large loads into the measuring system and exhibits a good thermal behavior due to the homogeneity of the material and to reduced wall thicknesses, which is especially advantageous in the case of high-resolution precision balances.

The fine working of parallel guide system 1 in the form of an ingot is limited to a very few fastening points for additional elements as 8 and 9 and, optionally, to thin areas 7.

We claim:

1. In a balance with a scale on top based on the principle of the electromagnetic compensation of force with a system carrier fixed to a housing, with a load receiver, with two guide rods which connect the load receiver to the system carrier in a vertically movable direction as parallel guide, whereby the system carrier, the two guide rods and the load receiver are a one-piece casting, with a translation lever and with a coupling element between load receiver and translation lever, whereby the force from the load received corresponding to the mass of the weighed material is transferred via the coupling element to a shorter lever arm of the translation lever and a coil of the electromagnetic compensation of force is fastened to a longer lever are of the translation lever, the improvement wherein the system carrier comprises lateral projections which extend into an area between the guide rod arms.

2. Balance with scale on top according to claim 1, wherein the lateral projections are designed as hollow bodies which are open to the outside.

3. Balance with scale on top according of claim 2, wherein the load receiver comprises two integrally cast bodes which widen the load receiver at least to the width of the system carrier.

4. Balance with scale on top according to claim 3, wherein crossbars are screwed to the outer sides of the integrally cast bodes and that the balance scale is supported on these crossbars.

5. Balance with scale on top according to claim 4, wherein the middle parts of the guide rod arms are reinforced and ribbed.

6. Balance with scale on top according to claim 5, wherein the ribs are designed as hollow bodies which are open to the outside.

7. Balance with scale on top according to claim 1, wherein the casting comprises casting bridges between the guide rods and the system carrier and between the load receiver and the system carrier which are not separated until the end of the working of the casting.

8. In a parallel guide system for precision balances consisting of an ingot with a system base which can be fixed to fixed points or which forms fixed points, with integrated parallel guide with an upper and lower guide rod pair for a load receiver which can move vertical relative to the system base under a load, the improvement wherein the ingot is formed aluminum die casting in which the system base extending between the guide rod pairs is divided upward and downward into ribs and into hollow areas open toward the top and/or toward the bottom in relation to horizontal planes running in this system base, whereby the ribs cross sections converge in the direction of hollow area openings and are aligned form the horizontal plane in the direction of a vertical system axis of plane or of parallels thereto, and wherein the load receiver is held parallel to a transverse system axis and at a parallel interval by upper and lower guide rods of the parallel guide and the back area of the ingot, which back area is designed as a body profile with hollow areas opening outwardly and diverging on both sides of a longitudinal axis as an axis of symmetry, and the parts of the system base located in the vertical free area between upper and lower guide rods and the upper and lower guide rods located at a vertical interval are divided by ribbing and hollow areas, whereby the ribs (19,22) are aligned on both sides of the longitudinal system axis in the direction of the transverse system axis (QA) or of parallels thereto and the rib cross sections converge in the direction of the openings in relation to parallels or the transverse system axis.

9. Parallel guide system according to claim 8, wherein the openings form throughs, and the bottoms of the openings running transversally to the ribs form profile reinforcements.

10. Parallel guide system according to claim 8, wherein the box profile of the load receiver comprises projections in the vertical plane which comprise ribs which open on the side facing away form the base part in the direction of the longitudinal system axis and converge in cross section and which projections comprise diverging openings.

11. Parallel guide system according to claim 8, wherein the ribs and openings are located in the upper and lower guide rods in the area between the integrated thin area merging into the load receiver and into the back end of the system base.

12. Parallel guide system according to claim 8, wherein the ingot exhibits an essentially rectangular contour form, whereby the receiving bearing for a load compensation means is located in the area of the back system base in the longitudinal system axis.

13. Parallel guide system according to claim 8, wherein the receiving bearing is cylindrical in order to receive a pot-shaped magnet.

14. Parallel guide system according to claim 13, wherein the ribbing of the system base, which ribbing projects vertically up and/or down, is formed by radial webs and/or tangential webs around the central point of the cylindrical receiving bearing.

15. Parallel guide system according to claim 7, wherein the ingot essentially exhibits the form of a symmetric trapezoid when viewed in a horizontal top view in which trapezoid the load receiver forms the shorter side of the trapezoid and the long side of the trapezoid running parallel thereto is formed by the back part of the system carrier and both parts are connected by the obliquely running upper and lower guide rods with thin areas and the edges of the thin areas run at a right angle to the axis of symmetry of the trapezoid.

16. Parallel guide system according to claim 7, wherein the load receiver comprises projections which run parallel to the transverse system axis and widen the load receiver at least to the width of the back base part.

17. Parallel guide system according to claim 7, wherein the projections comprise fastening bearings for crossbars completed to load receiver frame, whereby the crossbars support the actual load scale.

18. Parallel guide system according to claim 7, wherein the crossbars are designed as castings with ribbing.

* * * * *